(12) United States Patent
Isgar

(10) Patent No.: US 10,771,617 B1
(45) Date of Patent: Sep. 8, 2020

(54) MOBILE COMPUTING INTERVENING SYSTEM USING GEOFENCING

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 16/020,826

(22) Filed: Jun. 27, 2018

Related U.S. Application Data

(60) Provisional application No. 62/609,459, filed on Dec. 22, 2017.

(51) Int. Cl.
*H04M 1/725* (2006.01)
*H04W 4/12* (2009.01)
*H04W 4/021* (2018.01)

(52) U.S. Cl.
CPC ... *H04M 1/72577* (2013.01); *H04M 1/72572* (2013.01); *H04W 4/021* (2013.01); *H04W 4/12* (2013.01)

(58) Field of Classification Search
CPC ......... H04M 1/72577; H04M 1/72572; H04W 48/02–20; H04W 4/02–025; H04W 4/029
USPC ............................... 455/418–420, 456.1–457
See application file for complete search history.

(56) References Cited

U.S. PATENT DOCUMENTS

| | | | | |
|---|---|---|---|---|
| 6,150,955 A | * | 11/2000 | Tracy | G01D 4/006 340/870.02 |
| 2003/0182095 A1 | * | 9/2003 | Saito | H04W 16/18 703/14 |
| 2012/0064920 A1 | * | 3/2012 | Shaw | H04W 4/02 455/456.4 |
| 2012/0172027 A1 | * | 7/2012 | Partheesh | H04W 4/021 455/420 |
| 2013/0040632 A1 | * | 2/2013 | Wun | H04N 1/00103 455/420 |
| 2013/0257658 A1 | * | 10/2013 | Hall | G01S 5/02 342/451 |
| 2015/0319293 A1 | * | 11/2015 | Cerda | H04W 48/04 455/418 |

* cited by examiner

*Primary Examiner* — Allahyar Kasraian
(74) *Attorney, Agent, or Firm* — Schmeiser, Olsen & Watts LLP

(57) ABSTRACT

A mobile computing intervening system is described. The system may include a primary user computing device running a user application and at least one group user computing device running a user application and coupled to the primary user computing device. The system may operate to establish a geofence and automatically generate a signal to deactivate user computing devices, such as smartphones, within the geofence. This may be done for a certain period of time or until the primary user computing device ends the operation of the system. Families at dinner, students in class, employees in a workplace, and/or other social gatherings/environments may use this application to promote distraction free family time, class time, employment time, etc. by being unplugged from mobile computing devices.

20 Claims, 8 Drawing Sheets

MOBILE COMPUTING INTERVENING SYSTEM USING GEOFENCING

CROSS REFERENCE TO RELATED APPLICATION[S]

This application claims priority to U.S. Provisional Patent Application entitled "MOBILE COMPUTING CONTROL SYSTEM," Ser. No. 62/609,459, filed Dec. 22, 2017, the disclosure of which is hereby incorporated entirely herein by reference.

BACKGROUND OF THE INVENTION

Technical Field

This invention relates to a mobile computing intervening system particularly a mobile computing intervening system to shut down or intervene with certain functionality of mobile computing devices.

State of the Art

Users of mobile computing devices are often distracted in social and group settings such as, but not limited to, during family time, such as dinner time, in class, or other group settings. A research firm named Dscout has performed research and reports that the typical cellphone user touches his or her phone 2,617 time every day. Dscout also reports that the typical cellphone user goes through 150 mobile-device sessions every day, which includes actions like typing, tapping, and swiping the phone's screen counted as a "touch." Further, Dscout research also found that average users spent 145 minutes on their phones and engaged in 76 phone sessions per day.

Another study by the media analytics company comScore reports that the average American adult spent approximately 2 hours and 51 minutes on their smartphone every single day in 2017. Cellphone users are therefore projected to spend on social media apps over a lifetime approximately 5 years and 4 months.

Accordingly, a system to limit usability of mobile computing devices in a defined area for a defined period of time is needed to enhance engagement in social settings.

SUMMARY OF EMBODIMENTS

Disclosed is a mobile computing intervening system comprising: a computer server for running an application; a primary user computing device running a user application and coupled to the computer server; and a group user computing device running a user application and coupled to the computer server, wherein the computer server is programmed to: receive a signal from the primary user computing device including a location of the primary user computing device to establish that the primary user computing device has accessed the system; automatically determine a size and location of a geofence in response to processing the location of the primary user computing device and send instructions to the primary user computing device for automatic execution to establish the geofence; receive a signal from the primary user computing device to deactivate the one group user computing device in the geofence; and automatically process the signal received from the primary user computing device and send a signal to the group user computing device for automatic execution programmed instructions to deactivate the group user computing device.

The application may use geofencing. The application may use wireless technology. The application may send at least one message to the at least one group user computing device. The at least one message may be a topic for dinner conversation. The primary user mobile computing device may be a cell phone. The primary user mobile computing device may be a tablet. The at least one group user computing device may be a cell phone. The at least one group user computing device may be a tablet. The primary user mobile computing device may be further configured to deactivate or limit the use of the at least one group user computing device for a defined period of time.

Further, disclosed is a mobile computing intervening system comprising: a primary user computing device running a user application; and at least one group user computing device running a user application and coupled to the primary user computing device, wherein the primary user computing device is programmed to: identify a location of the primary user computing device in response to starting the application; automatically determine a size and location of a geofence in response to processing the location of the primary user computing device; automatically generate a signal to deactivate the at least one group user computing device within the geofence; and automatically send a signal to the at least one group user computing device for automatic execution programmed instructions to deactivate the group user computing device.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

The mobile computing intervening system as described herein provides an application which may be used to shut down, lock, or limit mobile computing devices, such as cell phones and/or tablets, in a defined area for a defined period of time with the prior permission or approval of each user in a group of users.

Figure 1A:
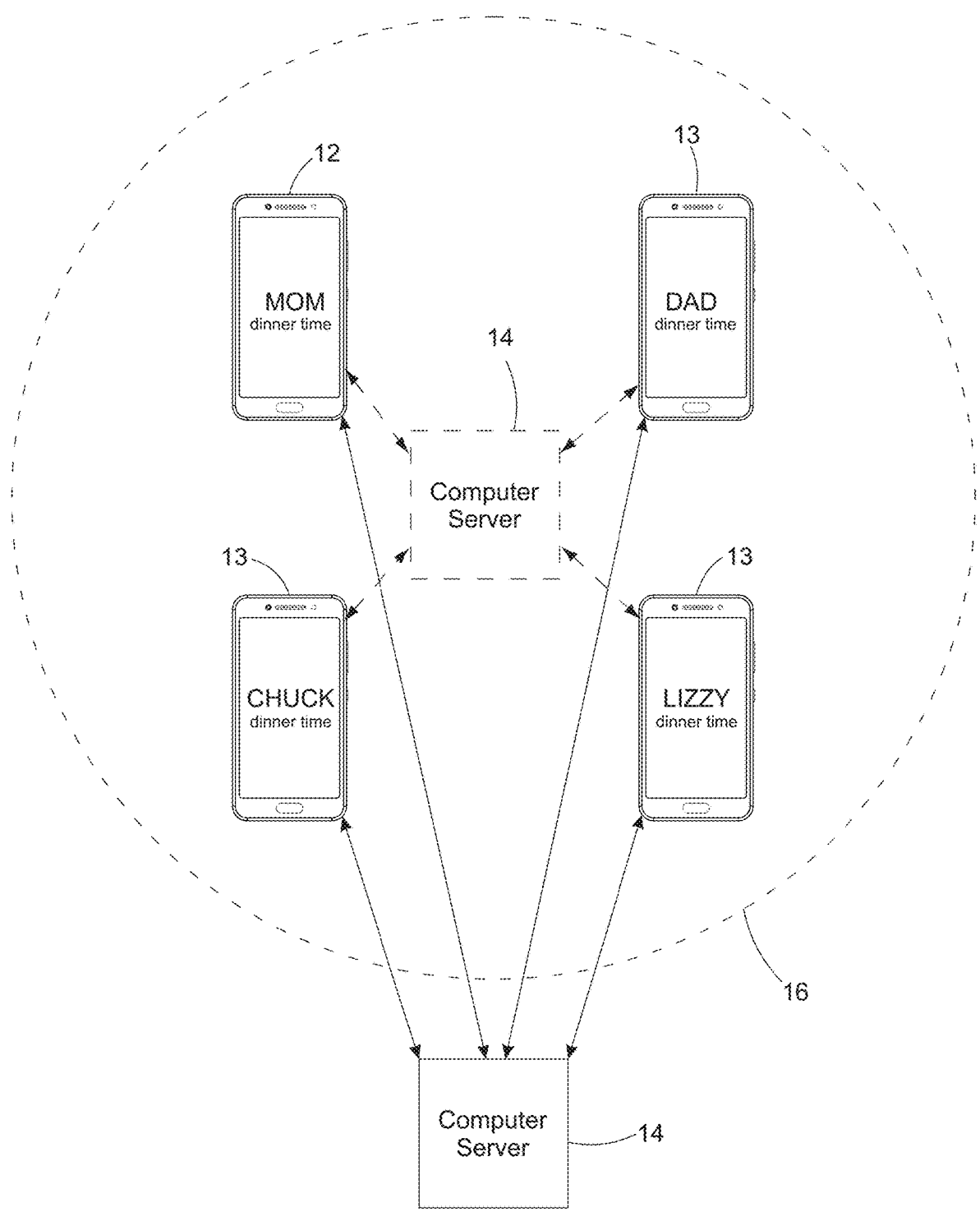
FIG. 1A is a diagrammatic view of a mobile computing intervening system used in a family setting, such as at dinner time, in accordance with an embodiment.
Figure 1B:
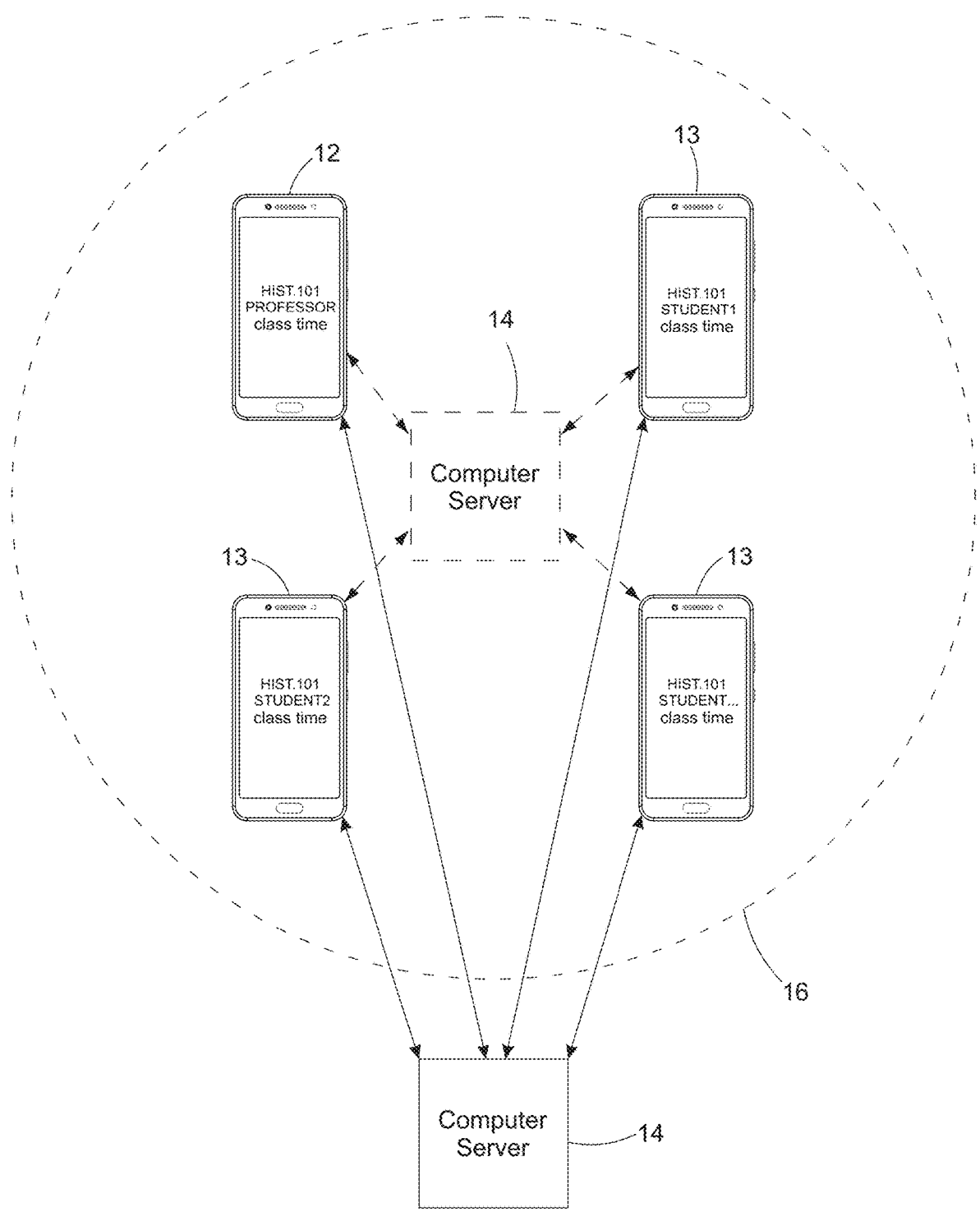
FIG. 1B is a diagrammatic view of a mobile computing intervening system used in a classroom setting in accordance with an embodiment.
Figure 1C:
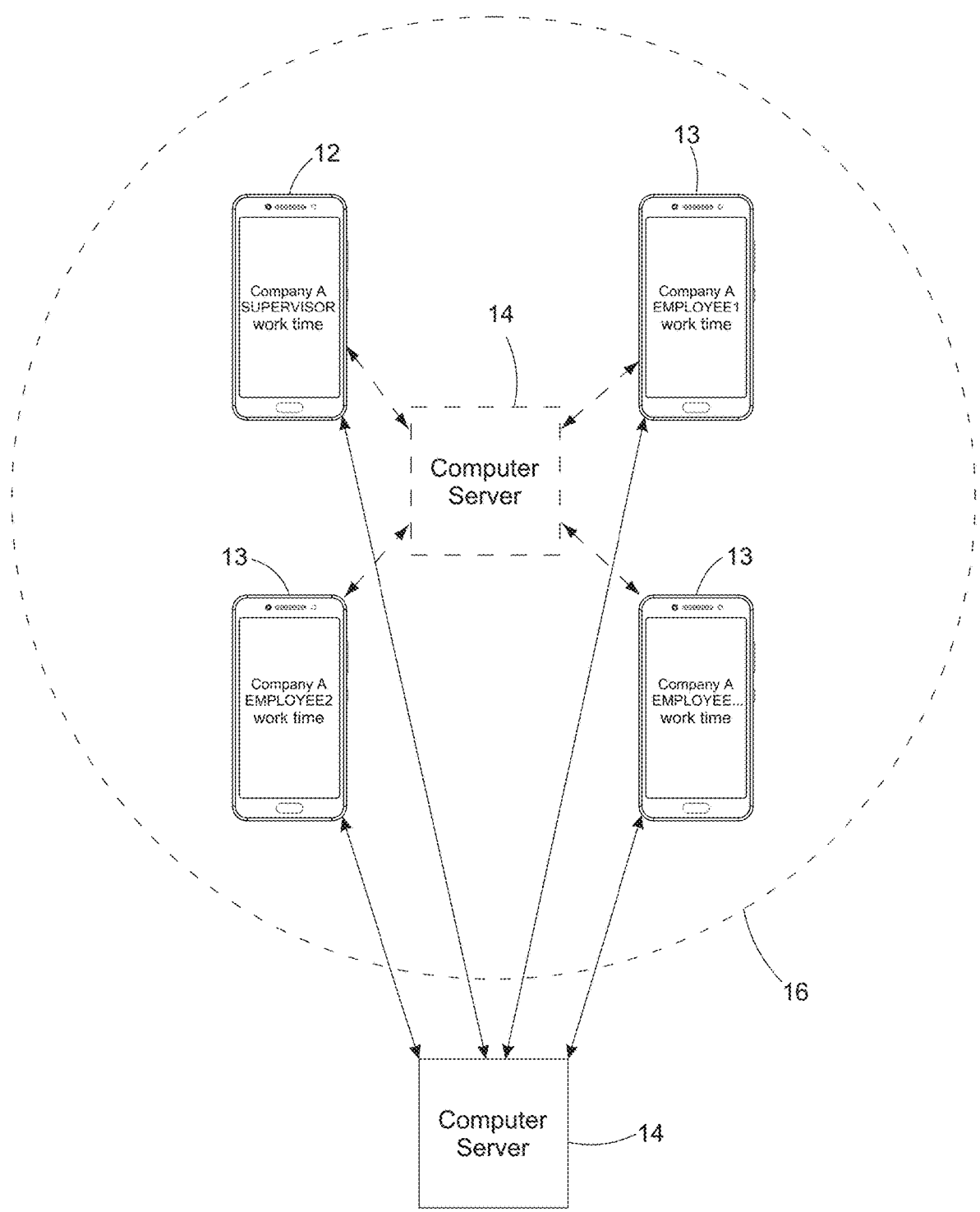
FIG. 1C is a diagrammatic view of a mobile computing intervening system used in a workplace setting in accordance with an embodiment.

Referring to the drawings, FIGS. 1A-1C depict an embodiment of a mobile computing intervening system 10. The system 10 may include a primary user computing device 12, one or more group user computing device 13, and a computer server 14, wherein the primary user computing device 12 and the one or more group user computing devices 13 are coupled to the computer server 14. This coupling may be a network connection, such as through an Internet connection, wherein the primary user computing devices 12 may communicate with and receive communication from the server 14. In operation, a geofence 16 may be established wherein all group user computing device 13 within the geofence are subject to deactivation. It will be understood that the computer server 14 may be within or remote to the geofence, as depicted in FIGS. 1A-1C.

Figure 2:
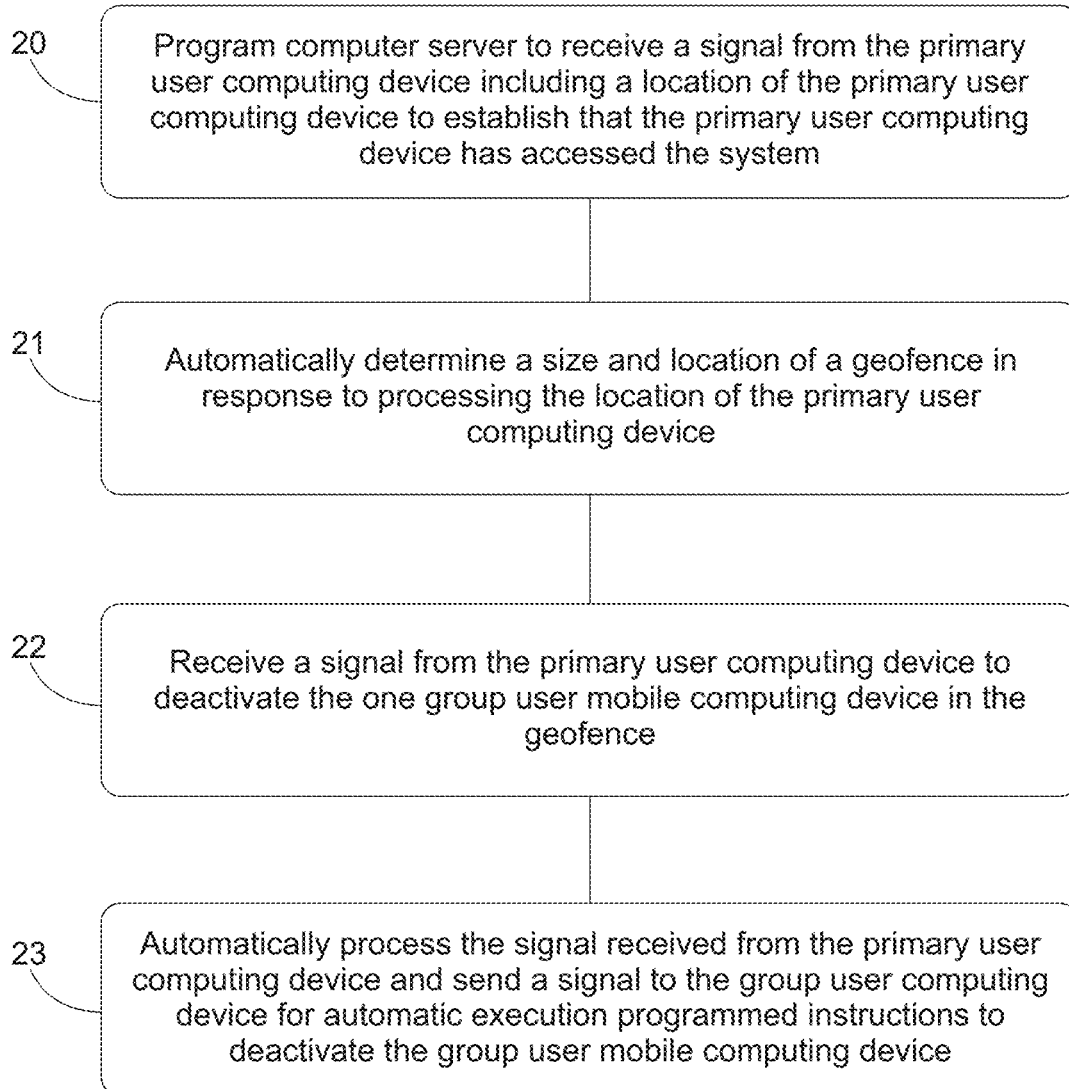
FIG. 2 is a flow chart of programmed steps of a computer server of a mobile computing intervening system in accordance with an embodiment.

The computer server 14 may include a memory storing an application that provides programmed instruction to the computer server when the application is executed. Referring to FIG. 2, the computer server 14 may be programmed to receive a signal from the primary user computing device including a location of the primary user computing device to establish that the primary user computing device has accessed the system (Step 20); automatically determine a size and location of a geofence in response to processing the location of the primary user computing device (Step 21); receive a signal from the primary user computing device to deactivate the one group user computing device in the geofence (Step 22); and automatically process the signal received from the primary user computing device and send a signal to the group user computing device for automatic execution programmed instructions to deactivate the group user computing device (Step 23).

The computer server may be further programmed to receive a signal from the primary user computing device to activate the one group user computing device in the geofence.

In embodiments, the application uses wireless technology. Further, the application may send at least one message to the at least one group user computing device, such as, but not limited to a topic for dinner conversation.

In embodiments, the primary user computing device 12 is a smartphone, and the at least one group user computing device 13 is a smartphone. Each of the primary user computing device 12 and the group user computing devices 13 operate a user application on the devices in order to access the system and communicate with the server. These user applications may be light applications using small amounts of computing resources. These user applications may also provide access to the phone settings in order to modify the settings to deactivate and activate the phones. In operation, with the phones running the user application, the phones may automatically execute instructions upon entering the geofence 16 in order to deactivate the phones, and further may automate activating the phones upon leaving the geofence 16 or when the geofence 16 is taken down by the primary user computing device 12. This data may be aggregated for each group user computing device 13 to determine number of sessions and time in that session for a period of time. This can be utilized by an approved interested party, such as a professor, a scholarship committee member, a parent or the like, in matters such as attendance in class and the like, in order to identify that the student is in class and limiting distractions from a smartphone. It should be understood that the approved interested party does not need to be within the geofence 16, and may be a remote third party. In some embodiments, the data may be reported in real time to the approved interested party or may be aggregated and stored for later access in report form from the system 10, or may automatically generate a report at user determined times and provide the generated report to the approved interested party. Further, the deactivation of the one group user computing device may be for a defined period of time.

There may be multiple settings in which this invention may be utilized. For example, it may be used in a family setting as shown in FIG. 1A with parents and children in an activity such as eating a meal and desiring to be distraction free, wherein a parent's device, such as the Mom, is the primary user computing device 12 and the remaining devices of the family are group user computing devices 13. It may also be used in a classroom setting as depicted in FIG. 1B, wherein the professor is the primary user computing device 12 and students are group user computing devices 13. In these embodiments, the system may report through the user application operating on the primary user computing device how many of the group user computing devices 13 have activated the user application and are thus subject to the operation of the system 10. It may also be used in a workplace setting as depicted in FIG. 1C, wherein the employer, supervisor or the like is the primary user computing device 12 and employees are group user computing devices 13. In these embodiments, the system may report through the user application operating on the primary user computing device how many of the group user computing devices 13 have activated the user application and are thus subject to the operation of the system 10 during work hours.

In these embodiments, the user application may automatically generate an outgoing text message to incoming contacts, such as text, phone call or the like, that indicates the primary user computing device 12 and the group user computing devices 13 are unavailable when the system 10 is active. These automatic messages may include, but are not limited to language such as, "I am eating now and will contact you later."; "I am in class now and will contact you later."; "I am working now and will contact you later."; and the like.

With specific reference to the workplace embodiment shown in FIG. 1C, the workplace may be any type of business, workplace, team manager, supervisor or employer-employee environment. The use of smartphones in the workplace is a drain of the productivity of the workforce. The operation of the system 10 in a workplace environment may operate as a "clock in" and "clock out" function for the employee. The employee or the like may activate the user application on his or her smartphone or other group user computing device 13 within the geofence 16. The group user computing device 13 may then be able to communicate with the system 10. Further, employee data, including the information of the employee activating the user application within the geofence 16 and the time that the smartphone 13 is within the geofence 16 with user application running may be reported to a server 14. The server 14 may be programmed to automatically produce and deliver to a supervisor or the like, a report that depicts the usage of the system 10 by the employees. This employee data can be utilized to determine effectiveness of employees and the effects of smartphone accessibility on productivity and/or safety of the employees.

When operating within the work environment, the system 10 may operate to track smartphone usage by the employee when the employee should be working. In these embodiments, the system 10 may determine whether the employee had his or her smartphone 13 within the geofence 16 operating the user application at times when the employee is clocked in and in a status of at work. Further, the system 10 may be configured to account for breaks by the employee, such as 15-minute breaks, lunch breaks and the like during the day, wherein the employee deactivates the user application during the break. This will lead to employees that still have the ability to utilize the phone 13 during breaks and reduce distraction from the smartphone 13 during times when the employee is working. Employers may also have the ability to vary the settings to allow employees to access their phones a certain number of times in a workday, for a certain amount of time in a workday, or a combination of certain number of times and amount of time in a workday. In other words, as previously stated, each employer and work group can establish acceptable limits of access and set the system to only alert or report when over use is recognized. Also, the system 10 can provide a report of cumulative distraction free time worked, start time and end time and frequency of distractions for a certain worker at their station.

Similar to the functionality of the system 10 within the workplace environment, embodiments may be utilized in secure access zones, wherein access to the secured access zones requires non-functionality of a digital devices and more particularly, non-functionality of smartphones. In similar fashion as depicted in FIG. 1C, the geofence 16 marks the boundary of the secured access zone. Entry of a group user computing device 13 within the geofence results in deactivation of the group user computing device 13, which may include deactivating the entire phone capabilities or deactivating certain phone capabilities, such as the ability to text, call, take photos, take videos, record audio save data to phone memory or otherwise gather data, and/or communicate with other devices. This allows entities that have certain proprietary information for display to maintain the proprietary information secret as they determine.

Additionally, the primary user computing device 12 may optionally select certain features of the primary user computing device 12 and the group user computing devices operating on the system 10 to be active when the system 10 is in operation. For example and without limitation, the primary user computing device 12 may select that all phones may receive emergency messaging when the system 10 is active.

Figure 3A:
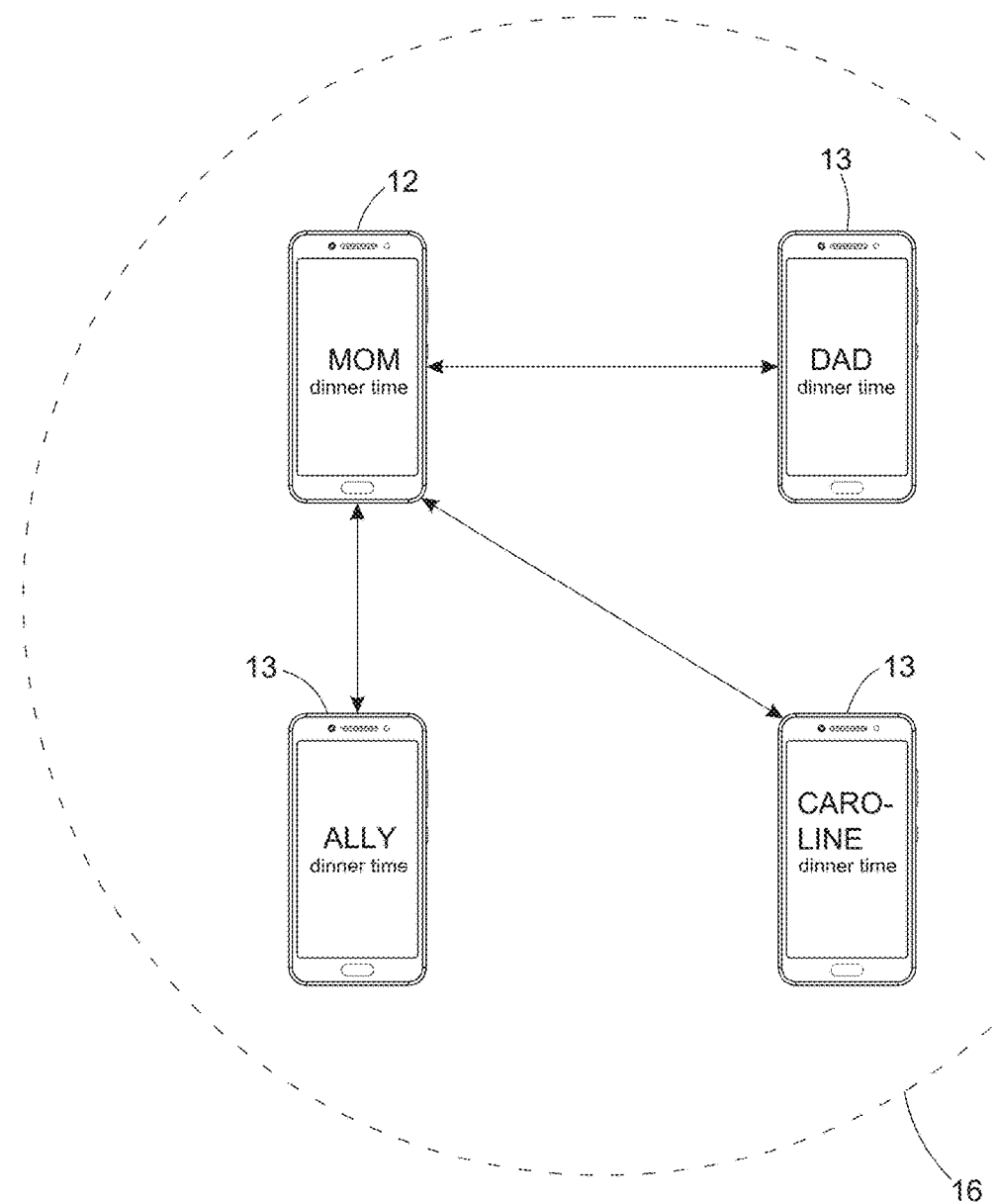
FIG. 3A is a diagrammatic view of another mobile computing intervening system used in a family setting, such as at dinner time, in accordance with an embodiment.
Figure 3B:
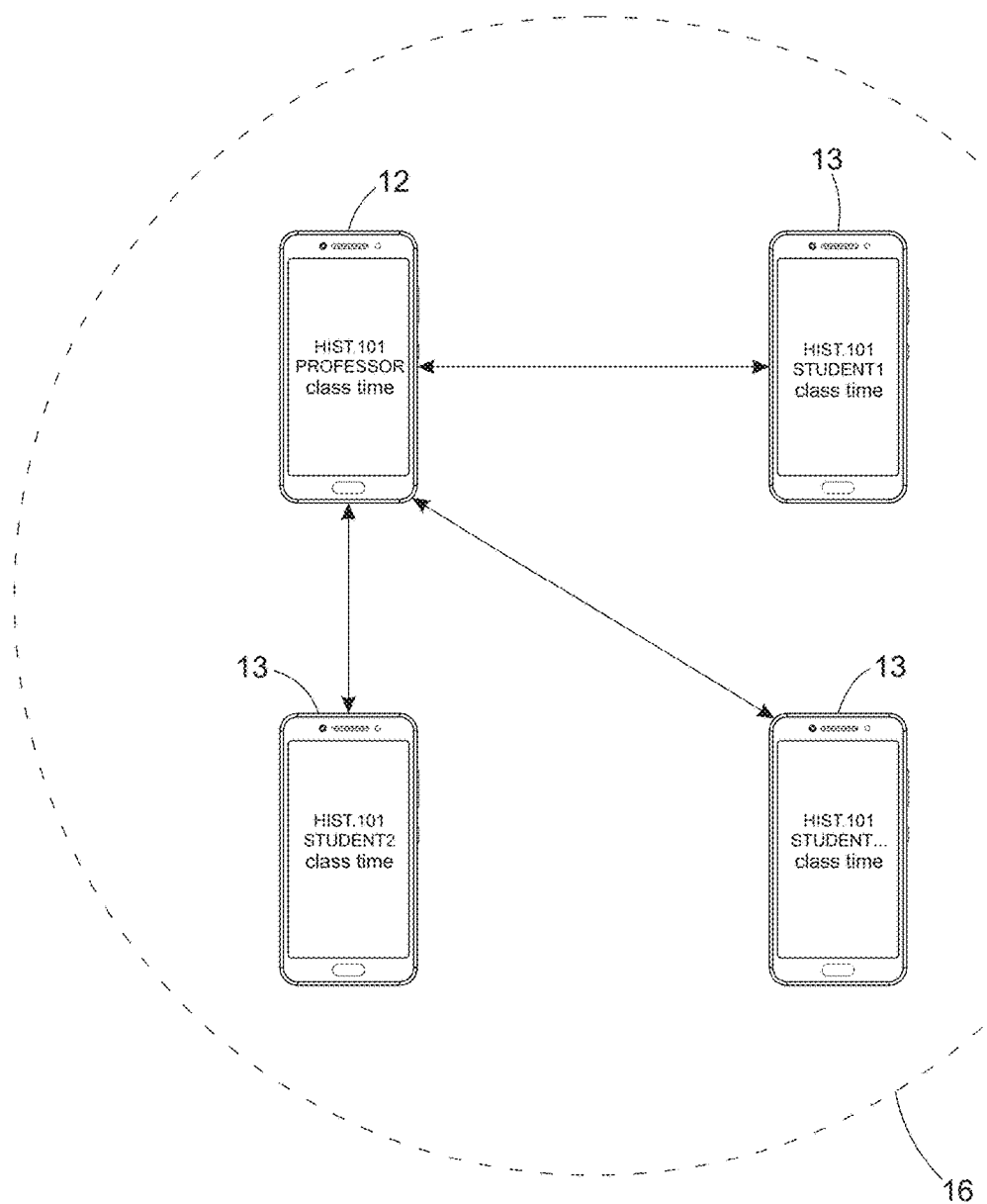
FIG. 3B is a diagrammatic view of another mobile computing intervening system used in a classroom setting in accordance with an embodiment.
Figure 3C:
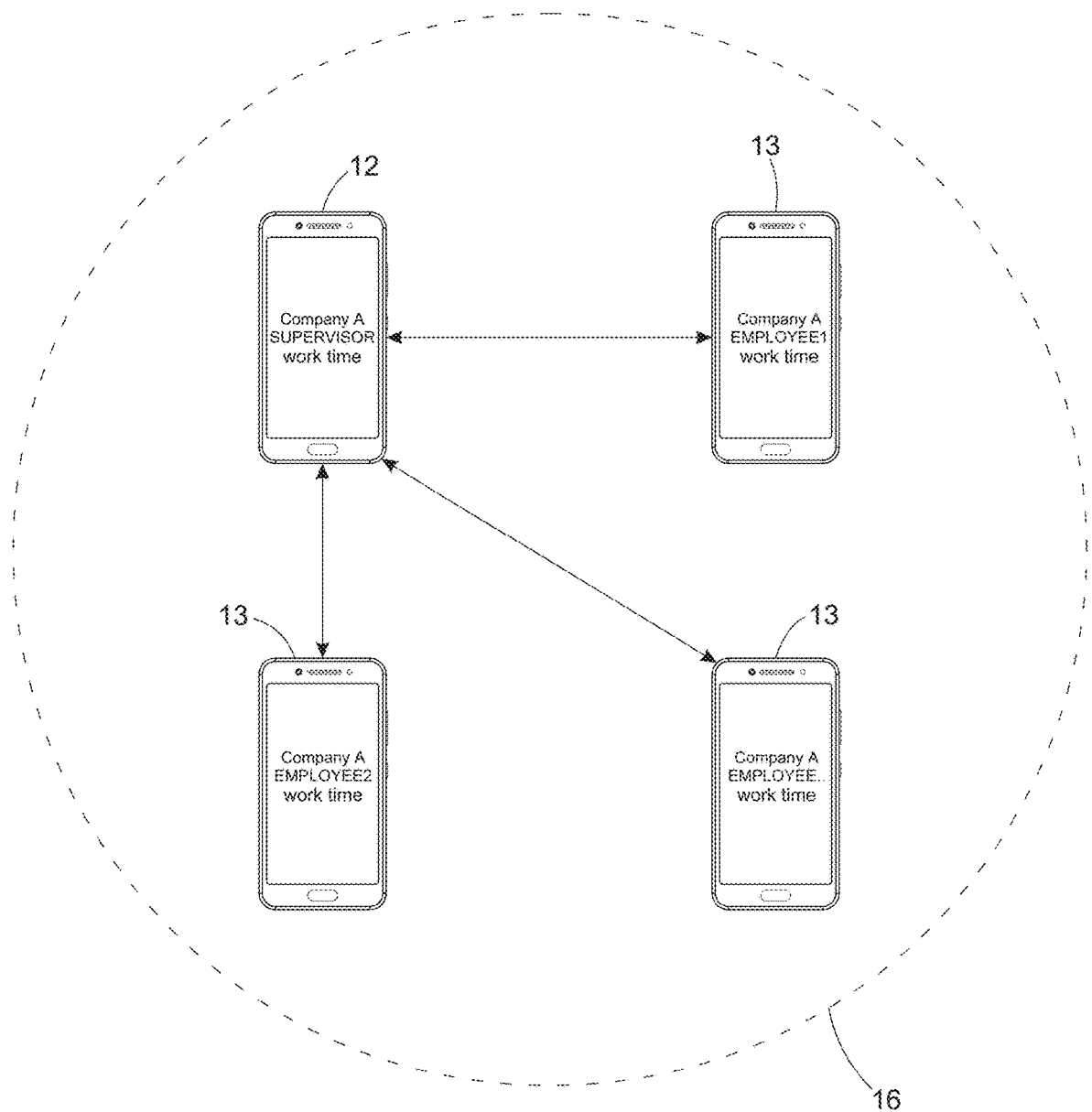
FIG. 3C is a diagrammatic view of another mobile computing intervening system used in a workplace setting in accordance with an embodiment.

Referring to the drawings, FIGS. 3A-3C depict embodiments of a mobile computing intervening system 10. The system 10 may include a primary user computing device 12 and one or more group user computing device 13. In operation, a geofence 16 may be established wherein all group user computing device 13 within the geofence are subject to deactivation.

Figure 4:
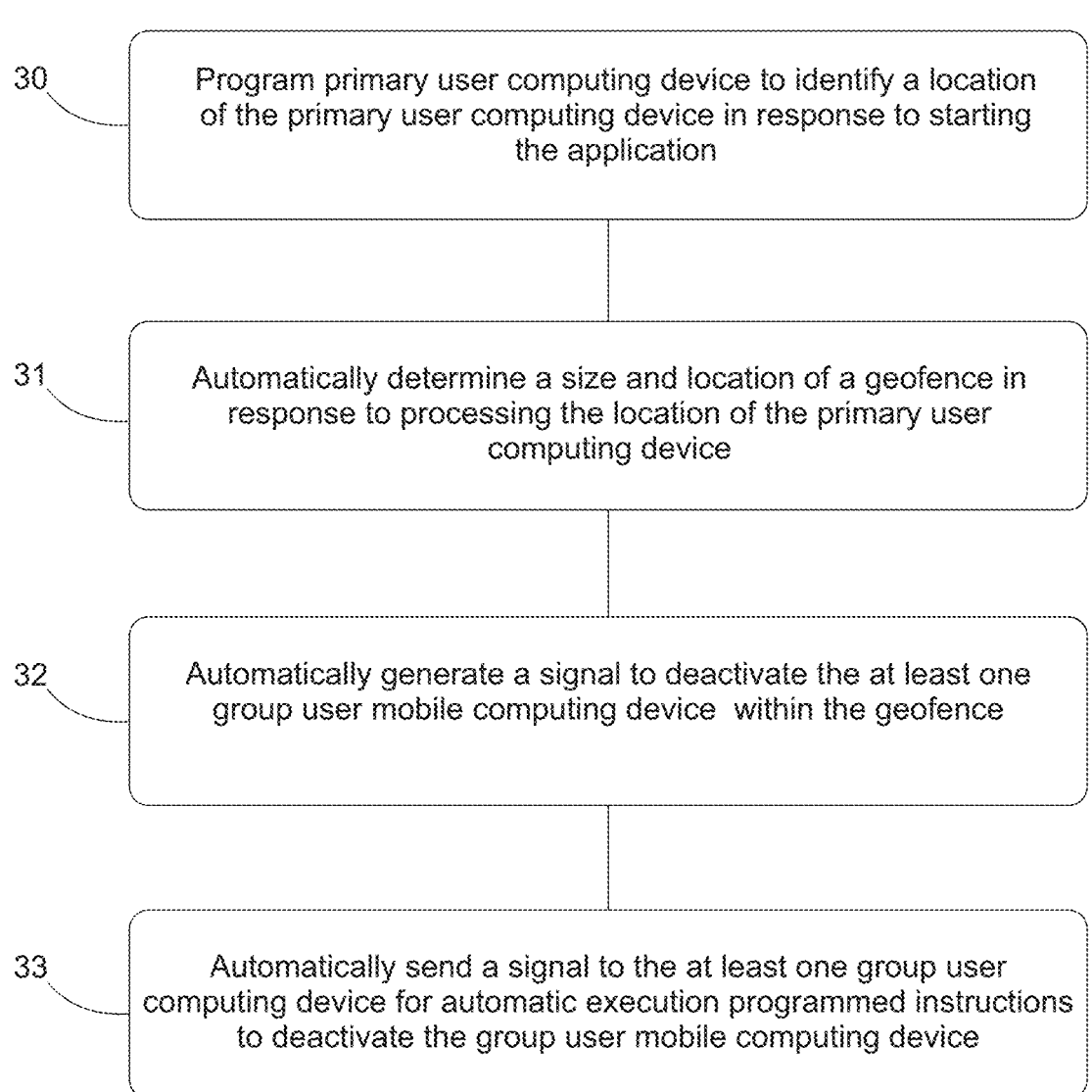
FIG. 4 is a flow chart of programmed steps of a primary user computing device of a mobile computing intervening system in accordance with an embodiment.

The primary user computing device 12 may include a memory storing an application that provides programmed instruction to the primary user computing device 12 when the application is executed. Referring to FIG. 4, the primary user computing device 12 may be programmed to identify a location of the primary user computing device in response to starting the application (Step 30); automatically determine a size and location of a geofence in response to processing the location of the primary user computing device (Step 31); automatically generate a signal to deactivate the at least one group user computing device within the geofence (Step 32); and automatically send a signal to the at least one group user computing device for automatic execution programmed instructions to deactivate the group user computing device (Step 33).

The primary user computing device 12 may be further programmed to send a signal to activate the at least one group user computing device within the geofence.

In embodiments, the application uses wireless technology. Further, the application may send at least one message to the at least one group user computing device, such as, but not limited to a topic for dinner conversation.

In embodiments, the primary user computing device 12 is a smartphone, and the at least one group user computing device 13 is a smartphone. Each of the primary user computing device 12 and the group user computing devices 13 operate a user application on the devices in order to access the system and communicate with the server. These user applications may be light applications using small amounts of computing resources. These user applications may also provide access to the phone settings in order to modify the settings to deactivate and activate the phones. In operation, with the phones running the user application, the phones may automatically execute instructions upon entering the geofence 16 in order to deactivate the phones, and further may automate activating the phones upon leaving the geofence 16 or when the geofence 16 is taken down by the primary user computing device 12. This data may be aggregated for each group user computing device 13 to determine attendance, consistent non-use of the system, and the like. This can be utilized by an approved interested party, such as a professor, a scholarship committee member, a parent or the like, in matters such as attendance in class and the like, in order to identify that the student is in class and limiting distractions from a smartphone. It should be understood that the approved interested party does not need to be within the geofence 16, and may be a remote third party. In some embodiments, the data may be reported in real time to the approved interested party or may be aggregated and stored for later access in report form from the system 10, or may automatically generate a report at user determined times and provide the generated report to the approved interested party. Further, the deactivation of the at least one group user computing device may be for a defined period of time.

There may be multiple settings in which this invention may be utilized. For example, it may be used in a family setting as shown in FIG. 3A with parents and children in an activity such as eating a meal and desiring to be distraction free, wherein a parent's device, such as the Mom, is the primary user computing device 12 and the remaining devices of the family are group user computing devices 13. It may also be used in a classroom setting as depicted in FIG. 3B, wherein the professor is the primary user computing device 12 and students are group user computing devices 13. In these embodiments, the system may report through the user application operating on the primary user computing device how many of the group user computing devices 13 have activated the user application and are thus subject to the operation of the system 10. It may also be used in a workplace setting as depicted in FIG. 3C, wherein the employer, supervisor or the like is the primary user computing device 12 and employees are group user computing devices 13. In these embodiments, the system may report through the user application operating on the primary user computing device 12 how many of the group user computing devices 13 have activated the user application and are thus subject to the operation of the system 10 during work hours.

In these embodiments, the user application may automatically generate an outgoing text message to incoming contacts, such as text, phone call or the like, that indicates the primary user computing device 12 and the group user computing devices 13 are unavailable when the system 10 is active. These automatic messages may include, but are not limited to language such as, "I am eating now and will contact you later."; "I am in class now and will contact you later."; "I am working now and will contact you later."; and the like.

Additionally, the primary user computing device 12 may optionally select certain features of the primary user computing device 12 and the group user computing devices operating on the system 10 to be active when the system 10 is in operation. For example and without limitation, the primary user computing device 12 may select that all phones may receive emergency messaging when the system 10 is active.

With specific reference to the workplace embodiment shown in FIG. 3C, the workplace may be any type of business, workplace, team manager, supervisor or employer-employee environment. The use of smartphones in the workplace is a drain of the productivity of the workforce. The operation of the system 10 in a workplace environment may operate as a "clock in" and "clock out" function for the employee. The employee or the like may activate the user application on his or her smartphone or other group user computing device 13 within the geofence 16. The group user computing device 13 may then be able to communicate with the system 10. Further, employee data, including the information of the employee activating the user application within the geofence 16 and the time that the smartphone 13 is within the geofence 16 with user application running may be reported to a primary user computing device 12 The primary user computing device 12 may be programmed to automatically produce and deliver to a supervisor or the like, a report that depicts the usage of the system 10 by the employees. This employee data can be utilized to determine effectiveness of employees and the effects of smartphone accessibility on productivity and/or safety of the employees.

When operating within the work environment, the system 10 may operate to track smartphone usage by the employee when the employee should be working. In these embodiments, the system 10 may determine whether the employee had his or her smartphone 13 within the geofence 16 operating the user application at times when the employee is clocked in and in a status of at work. Further, the system 10 may be configured to account for breaks by the employee, such as 15-minute breaks, lunch breaks and the like during the day, wherein the employee deactivates the user application during the break. This will lead to employees that still have the ability to utilize the phone 13 during breaks and reduce distraction from the smartphone 13 during times when the employee is working. Employers may also have the ability to vary the settings to allow employees to access their phones a certain number of times in a workday, for a certain amount of time in a workday, or a combination of certain number of times and amount of time in a workday. In other words, as previously stated, each employer and work group can establish acceptable limits of access and set the system to only alert or report when over use is recognized. Also, the system 10 can provide a report of cumulative distraction free time worked, start time and end time and frequency of distractions for a certain worker at their station.

Similar to the functionality of the system 10 within the workplace environment, embodiments may be utilized in secure access zones, wherein access to the secured access zones requires non-functionality of a digital devices and more particularly, non-functionality of smartphones. In similar fashion as depicted in FIG. 3C, the geofence 16 marks the boundary of the secured access zone. Entry of a group user computing device 13 within the geofence results in deactivation of the group user computing device 13, which may include deactivating the entire phone capabilities or deactivating certain phone capabilities, such as the ability to text, call, take photos, take videos, record audio save data to phone memory or otherwise gather data, and/or communicate with other devices. This allows entities that have certain proprietary information for display to maintain the proprietary information secret as they determine.

The mobile computing intervening system 10 may use geofencing technology to establish geofence 16. Geofencing as used herein refers to the practice of limiting mobile users to a specific geographic location by tracking their whereabouts via the technology of a global positioning system (GPS). Geofencing triggers an action when the mobile computing device enters a set or defined location, such as a dining room. In addition, geofencing provides a messaging technology service. In some embodiments, the geofence 16 may be a user defined geofence, wherein the primary user may create the user defined geofence, such as, but not limited to selecting a desired radius from the primary user computing device 12, or drawing the shape of the geofence on the primary user computing device 12, wherein the geofence 16 is automatically adjusted to the user defined geofence.

An application as used herein may include a mobile application and/or website. Suitable defined areas include, but are not limited to, dinner, class and/or other settings that users agree to be unplugged from electronic communication for a defined period of time. The primary user may send an alert and/or message to a group user, such as a topic(s) for dinner conversation.

In the alternative, the application may be activated and/or deactivated by the primary user through wireless technology, such as Bluetooth™. The group of users (primary user and at least one group user) may have a designated group leader (primary user) with the capability to activate and deactivate the unplugged or deactivation function.

Further, the devices 12 and 13 may communicate with each other through a Near Field Communication ("NFC") link. NFC is related to radio-frequency identification (RFID) with the exception that NFC is designed for use by devices within close proximity to each other. Devices using NFC may be active or passive. A passive device has information that is readable by other devices; however, the passive device cannot read information of another device. Active devices can read and send information. An example of an active device is a smartphone. In active NFC, each device is active and when a device sends data it generates an RF field and when waiting the device does not generate an RF field. In other words, the RF field is alternately generated by each device. In passive NFC, the RF field is only generated by one device. NFC devices may also provide secure communication by using a secure channel and encryption when sending sensitive information.

In general, there are three current signaling technologies for NFC devices to talk to each other. These signaling technologies are referred to as NFC-A, NFC-B and NFC-F.

When devices first communicate, they communicate the signal type and then transmit data in compliance with the specified protocol.

NFC-A corresponds with RFID Type A communication. In Type A communication, Miller encoding is used with amplitude modulation at 100 percent. A signal sent between devices must change from 0 to 100 percent to register the difference between sending a "1" and a "0." Data is transmitted at 106 Kbps when using Type A communication.

Similar to NFC-A, NFC-B corresponds with RFID Type B communication. Type B uses Manchester encoding. Amplitude modulation is at 10 percent, wherein a 10 percent change from 90% for low to 100% for high is used. A change from low to high represents a "0" while high to low represents a "1."

NFC-F refers to a faster form of RFID transmission known as FeliCa. FeliCa is a technology similar to NFC but faster and currently more popular. It is used for a variety of services such as subway tickets, credit card payments, and identification at office buildings and other locations with limited access.

The system 10 may utilize various types of NFC communication, including active or passive NFC, as well as using various types of signals. The NFC would provides close proximity communication between the primary user computing device 12 and the group user computing devices 13.

The family time promoting application may disable access of users in a defined area. The application may allow a parent(s) of a household to deactivate wireless networking and/or mobile computing devices.

Embodiments may be available on or through the internet, such as through domain names reserved and owned by Applicant that include iameatingnow.com, weareeatingnow.com, iaminclassnow.com, iamworkingnow.com, phonebarrier.com, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A mobile computing intervening system comprising:
a computer server for running an application;
a primary user computing device running a user application and coupled to the computer server; and
a group user computing device running a user application and coupled to the computer server, wherein the computer server is programmed to:
receive a signal from the primary user computing device including a location of the primary user computing device to establish that the primary user computing device has accessed the system;
automatically determine a size and location of a geofence in response to processing the location of the primary user computing device and send instructions to the primary user computing device for automatic execution to establish the geofence;
receive a signal from the primary user computing device to deactivate the one group user computing device in the geofence;
automatically process the signal received from the primary user computing device and send a signal to the group user computing device for automatic execution programmed instructions to deactivate the group user computing device; and
automatically send data regarding utilization of the system by the group user computing device to a remote approved interested party outside of the geofence, wherein the data comprises number of sessions within the geofence and time of each of the sessions within the geofence.

2. The mobile computing intervening system of claim 1, wherein the computer server is further programmed to receive a signal from the primary user computing device to activate the one group user computing device in the geofence.

3. The mobile computing intervening system of claim 1, wherein the application uses wireless technology.

4. The mobile computing intervening system of claim 1, wherein the application sends at least one message to the at least one group user computing device, in response to the at least one group user computing device entering the geofence.

5. The mobile computing intervening system of claim 4, wherein the at least one message is a topic for dinner conversation.

6. The mobile computing intervening system of claim 1, wherein the primary user mobile computing device is a smartphone.

7. The mobile computing intervening system of claim 1, wherein the at least one group user computing device is a smartphone.

8. The mobile computing intervening system of claim 1, wherein the deactivation of the one group user computing device is for a defined period of time.

9. A mobile computing intervening system comprising:
a primary user computing device running a user application; and
at least one group user computing device running a user application and coupled to the primary user computing device, wherein the primary user computing device is programmed to:
identify a location of the primary user computing device in response to starting the application;
automatically determine a size and location of a geofence in response to processing the location of the primary user computing device;
automatically generate a signal to deactivate the at least one group user computing device within the geofence;
automatically send a signal to the at least one group user computing device for automatic execution programmed instructions to deactivate the group user computing device; and
automatically send data regarding utilization of the system by the at least one group user computing device to a remote approved interested party outside of the geofence, wherein the data comprises number of sessions within the geofence and time of each of the sessions within the geofence.

10. The mobile computing intervening system of claim 9, wherein the primary user computing device is further programmed send a signal to activate the at least one group user computing device within the geofence.

11. The mobile computing intervening system of claim 9, wherein the application uses wireless technology.

12. The mobile computing intervening system of claim 9, wherein the application sends at least one message to the at least one group user computing device, in response to the at least one group user computing device entering the geofence.

13. The mobile computing intervening system of claim 12, wherein the at least one message is a topic for dinner conversation.

14. The mobile computing intervening system of claim 9, wherein the primary user mobile computing device is a smartphone.

15. The mobile computing intervening system of claim 9, wherein the at least one group user computing device is a smartphone.

16. The mobile computing intervening system of claim 9, wherein the deactivation of the at least one group user computing device is for a defined period of time.

17. The mobile computing intervening system of claim 9, wherein the geofence is a user defined geofence.

18. The mobile computing intervening system of claim 17, wherein the user defined geofence is a selected desired radius from the primary user computing device.

19. The mobile computing intervening system of claim 17, wherein the user defined geofence is a drawing of a shape of the geofence on the primary user computing device.

20. The mobile computing intervening system of claim 17, wherein the geofence is automatically adjusted to the user defined geofence.

\* \* \* \* \*